United States Patent Office 3,556,617
Patented Jan. 19, 1971

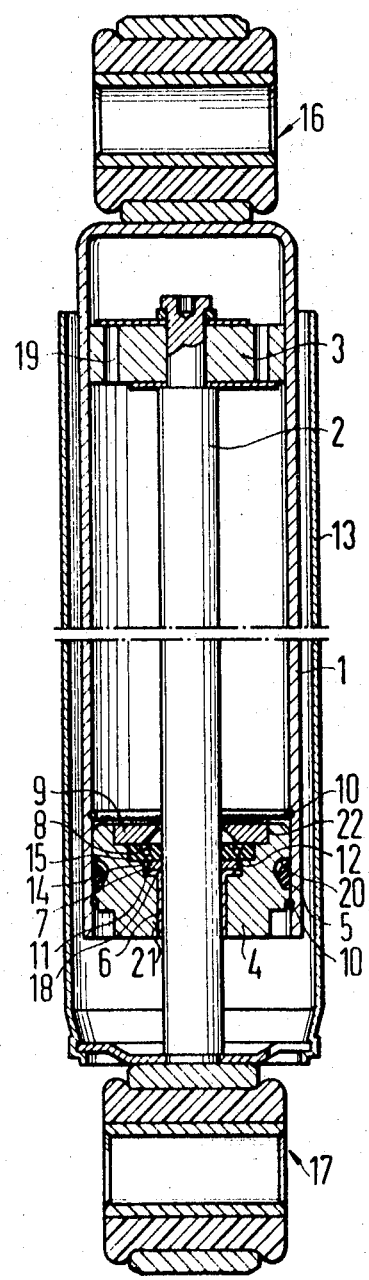

3,556,617
PISTON ROD SEAL FOR SHOCK ABSORBERS
Ludwig Axthammer, Schweinfurt am Main, Heinz Liebeling, Siegburg-Kaldauen, and Felix Wössner, Schweinfurt am Main, Germany, assignors to Fichtel & Sachs AG, Schweinfurt am Main, Germany
Filed Dec. 31, 1968, Ser. No. 788,154
Claims priority, application Germany, Jan. 10, 1968, 1,650,955
Int. Cl. F16c *33/72*
U.S. Cl. 308—3.5                          8 Claims

ABSTRACT OF THE DISCLOSURE

A piston rod seal for a shock absorber is provided with a stiff spacer ring which axially separates a relatively soft, elastomeric, annular sealing disc about the piston rod from the clearance space between the rod and a liner in a guide member, thereby making it unnecessary to maintain close tolerances in the liner, the piston rod, and the guide member. The sealing disc, the spacer ring, and a retaining ring which holds the sealing disc in axially abutting engagement with the spacer ring are received in a stepped central passage of the guide member which permits the spacer ring to move radially with the piston ring if the latter is deflected in service.

BACKGROUND OF THE INVENTION

This invention relates to shock absorbers and similar suspension apparatus of the piton-and-cylinder type, and particularly to an arrangement for sealing an axial end of the cylinder penetrated by the piston rod and for guiding the piston rod.

In its more specific aspects, this invention is concerned with an improvement in the piston rod seal disclosed in the Heckethorn Pat. No. 3,227,497. The cylinder cavity of the known shock absorber is bounded at one axial end by a guide bushing of sintered iron formed with a central passage which movably receives the piston rod. A circumferentially slotted, annular antifriction liner conformingly received in the passage of the guide bushing snugly embraces the piston rod. An integral overturned flange of the liner axially abuts against a radial face of the guide bushing directed toward the cylinder cavity, and is held against the face by a coaxial sealing disc of elastomeric material. The sealing disc is pressed aaginst the liner flange and the guide bushing by the high internal fluid pressure in the cylinder cavity.

It has now been found that the cross section of the piston rod, the radial wall thickness of the antifriction liner, and the cross section of the central passage in the guide bushing of the known device must be controlled to extremely close dimensional tolerances if leakage along the piston rod is to be prevented over extended periods of operation. Even a relatively small deviation from design values in only one of the three critical dimensions mentioned causes a small gap to be opened between the flanged end of the antifriction liner and the piston rod, and the relatively soft sealing disc tends to be wedged into the gap by the fluid pressure in the cylinder, whereby the disc may be damaged and axial movement of the piston rod is impeded.

It is a primary object of this invention to prevent wedging engagement of a sealing element with the piston rod and an antifriction liner in the central passage of a guide member in a shock absorber of the type described regardless of minor dimensional deviations of elements of the seal from precise design values, and thereby to reduce the cost of the shock absorber which no longer needs to be manufactured to unusually close dimensional tolerances.

SUMMARY OF THE INVENTION

With this object and others in view, as will hereinafter become apparent, the invention provides an annular spacer axially interposed between the flange of the liner and the sealing disc in a sealing and guiding arrangement for a piston rod having many features in common with the aforedescribed known device. The spacer of the invention consists of much more rigid material than the yieldably resilient material of the sealing disc and has a low coefficient of friction in contact with the steel or other metal of the piston rod which is conformingly received in the central opening of the spacer. The outer periphery of the spacer is smaller in cross section than the portion of the passage in the guide member in which the spacer is received so that the spacer and the guide member radially define a gap therebetween.

Other features and many of the attendant advantages of this invention will readily become apparent from the following detailed description of a preferred embodiment of the invention when considered in connection with the appended drawing.

BRIEF DESCRIPTION OF THE DRAWING

The sole figure of the drawing shows a shock absorber of the invention in axial, elevational section.

DESCRIPTION OF THE PREFERRED EMBODIMENT

The illustrated shock absorber has a cylinder 1 having one closed axial end and one open end. A piston rod 2 fixedly attached to a piston 3 in the cylinder 1 is guided through the open end of the cylinder by a guide member 4 having the overall shape of a plug received in the open cylinder end. An annular sealing ring 5 of elastomeric material is partly received in an annular groove 20 in the outer wall of the guide member 4 and seals the cylinder cavity from the surrounding atmosphere in simultaneous abutting engagement with the cylinder 1 and the guide member 4. The groove 20 is shaped and dimensioned to receive substantially the entire ring 5 when it is desired to charge the cylinder 1 with the liquid and/or gas axially led to the ring 5 from the outside under adequate pressure, as is known in itself.

The guide member 4 which may consist of sintered iron powder or other metallic material has a central, axial passage therethrough which flares in four, generally cylindrical steps in a direction inward of the cylinder cavity and coaxially receives the piston rod 2. The outermost portion 21 of the passages receives antifriction liner 6, known in itself, which is of tubular shape and split circumferentially, the slot in the liner being obliquely inclined relative to the cylinder axis, as is known and not explicitly shown in the drawing. The inner end of the liner 6 is provided with an integral outturned flange 11 received in the wider second portion 14 of the passage in the guide member 4.

The second cylindrical passage portion 14 also receives a flat spacer ring 7 whose circular outer periphery is so much smaller in diameter than the passage portion 14 that the ring 7 and the guide member 4 radially define therebetween an annular gap 12 in the passage portion 14. The spacer ring 7 is axially held against the ring 7 by a resilient sealing disc 8 received in a further enlarged third portion 15 of the passage in the guide member 4 and axially held against the spacer ring 7 by a flat retaining ring 9 in the innermost and widest fourth portion 22 of the guide passage. The metallic ring 9 is fixedly fastened to the guide member 4 in a conventional manner, not shown, as by engaged threads, a shrink fit, or soldering.

The guide member 4 is axially secured in the open end of the cylinder 1 between two snap rings 10 partly received in grooves in the inner cylindrical wall of the cylinder 1. The closed axial end of the cylinder 1 carries an eye assembly 16, and a similar assembly 17 is attached to the outer axial end of the piston rod 2 for mounting the illustrated shock absorber between the sprung and unsprung masses of a vehicle in a conventional manner. The outer end of the piston rod 2 also carries a coaxial, cup-shaped outer shell 13 which partly envelops the cylinder 1 and protects the rod 2 and the sealing arrangement. The piston 3 has valved throttle passages 19 conventional in this art, and the cavity of the cylinder 1 is normally filled in part with a liquid and in part with a highly compressed gas such as nitrogen or air when in the operative condition.

A durable, leakproof seal is formed about the piston rod 2 in the guide member 4 by the selection of specific materials for the illustrated elements of the sealing and guiding assembly, and by specific dimensional relationships. The spacer ring 7 consists of a material much more rigid and harder than that of the sealing disc 8 and having a low coefficient of friction in sliding contact with the metal of the piston rod 2. Preferred materials for the spacer ring are aluminum and aluminum alloys, bronze, and polytetrafluoroethylene reinforced with embedded glass fibres.

The diameter of the central opening in the ring 7 and the diameter of the piston rod 2 are carefully matched to hold the clearance between the rod and the ring to a minimum, and to a smaller value than the radial clearance between the piston rod 2 and the antifriction liner 6 at the inner end of the latter near the flange 11. A close sliding fit between the piston rod 2 and the spacer ring 7 is achieved easily enough at low cost. No other dimension of the ring 7 nor of the rod 2 need be maintained with equally small tolerances.

The dimensions of the inner end of the liner 6 and of associated elements are not particularly critical. Thus, the shoulder 18 of the guide member 4 at the transition between the passage portions 21 and 14 which is received in the axially and radially open, annular receptacle between the flange 11 and the outer wall of the liner 6 can be rounded in all sectional planes through the axis of the cylinder 1, thereby avoiding the danger of tearing the flange 11 from the liner 6 in the event of a sudden rise in fluid pressure within the cylinder 1 or a sudden movement of the piston rod 2.

Because of the gap 12, the rigid spacer ring 7 may move with the piston rod 2 when the latter is deflected radially in service. The tightness of the engagement between the spacer ring 7 and the rod 2 is not affected by such deflection, and it is impossible for the sealing disc 8 to be wedged in a gap opening along the piston rod. The spacer ring 7 is too rigid to be wedged between the liner 6 and the piston rod 2. It will be appreciated that the gap 12 must have a radial width equal to or greater than the greatest transverse deflection of the piston rod 2 that can be expected to occur in service.

The preferred material for the sealing disc 8 is "Viton LM," an elastomeric copolymer of hexafluoropropylene and vinylidene fluoride of relatively low molecular weight manufactured by du Pont de Nemours & Co., and particularly "Viton LM 44 936," a grade of the copolymer sold in Germany by K.F.W. Freudenberg, which is softer than the polytetrafluoroethylene of the flange 11. The shape of the disc 8 is evident from the drawing. Its inner periphery is beveled so that it engages the piston rod 2 with a lip of reduced axial thickness. The disc 8 otherwise conforms to the passage portion 15 and fills the same when in the illustrated radially and axially compressed condition.

The inner periphery of the flat retaining ring 9 is also beveled so that the ring 9 engages the idsc 8 only along the outer periphery of the latter. The central opening of the ring 9 is greater in cross section than the piston rod 2, whereby the fluid in the cylinder 1 has free access to the central portion of the top face of the sealing disc 8 and normally presses the disc 8 axially against the spacer ring 7, and the latter against the flange 11. The disc 8 cannot enter the minimal clearance space between the spacer ring 7 and the piston rod 2. The rigid ring 7 cannot enter the somewhat wider clearance space between the liner 6 and the piston rod 2. It thus exerts axial pressure only on the flange 11 and not on the tubular portion of the liner 6, and does not tend to tear the flange 11 from the tubular liner portion as could be the case with a softer element arranged adjacent the liner.

The liner 6 is preferably made from a polytetrafluoroethylene blank having the shape of a parallelogram and a thickness of approximately 0.4 mm. in a known manner more fully described in theafore-mentioned patent.

In building the afore-described shock absorber of the invention, the guide member 4 is easily assembled with the liner 6, spacer ring 7, sealing disc 8, and retaining ring 9, and the sub-assembly so prepared is slipped over the piston rod 2 and installed in the cylinder 1 as a unit. Actual embodiments of the shock absorber have been found to be relatively inexpensive to build and install, and to perform reliably over extended periods.

While the invention has been described with particular reference to a hydropneumatic shock absorber, the fluid contained in the cylinder 1 during operation of the device is not in itself of primary relevance to the invention, and it will be appreciated that the sealing and guiding arrangement of the invention is equally applicable to similarly constructed pneumatic springs and other load supporting apparatus of analogous structure.

We claim:

1. In a cylinder-and-piston type load supporting apparatus wherein a piston rod (2) is arranged for axial movement inward and outward of the cavity in cylinder (1) through a passage (21, 14, 15, 22) in an annular guide member (4 axially bounding the cavity, a tubular antifriction liner (6) is interposed between the piston rod (2) and the guide member (4) in the passage of the latter, and outturned flange (11) on the inner end of said liner (6) being superimposed on a radially extending face of the guide member (4) directed toward said cavity, and an annular sealing member (8) of yieldably resilient material softer than the material of said flange (11) conformingly receiving said piston rod (2) therein and sealingly engages said guide member (4) adjacent said flange (11), the improvement which comprises:

(a) an annular spacer member (7) axially interposed between said sealing member (8) and said flange (11) in an axial portion (14) of said passage;

(b) said spacer member essentially consisting of a material substantially more rigid than said yieldably resilient material, and having a low coefficient of friction in contact with said piston rod (2);

(c) said spacer member having a central opening conformingly receiving said piston rod (2) in movable engagement;

(d) the outer periphery of said spacer member being smaller in cross section than said portion (14) of said passage and radially defining with said guide member (4) a gap (12) in said passage;

(e) said liner (6) and said flange (11) being integrally formed and essentially consisting of polytetrafluoroethylene, said spacer member (7) essentially consisting of aluminum, bronze, or glass-fiber-reinforced polytetrafluoroethylene, and said sealing member (8) essentially consisting of a copolymer of hexafluoropropylene and vinylidene fluoride.

2. In an apparatus as set forth in claim 1, said piston rod (2) being received in said central opening of said spacer member (7) and in said inner end of said liner (6) with respective radial clearances, the clearance in said central opening being smaller than the clearance in said inner end.

3. In an apparatus as set forth in claim 1, said flange (11) being received in said portion (14) of said passage, said portion and said spacer member (7) being of substantially circular cross section about the axis of said cylinder (1).

4. In an apparatus as set forth in claim 1, said sealing member (8) being received in another axial portion (15) of said passage contiguously adjacent said spacer member (7), and retaining means (9, 10) axially securing said sealing member (8) in said passage in abutting engagement with said spacer member (7).

5. In an apparatus as set forth in claim 4, said retaining means including an annular retaining member (9) received in yet another axial portion (22) of said passage, said sealing member (8) being axially interposed between said spacer member (7) and said retaining member (9) and having a cross section transverse to the axis of said cylinder (1) greater than the corresponding cross section of said spacer member (7) and smaller than the corresponding cross section of said retaining member (9).

6. In an apparatus as set forth in claim 1, said flange (11) and said liner (6) defining an annular receptacle open in a radially outward direction, said guide member (4) having an annular shoulder portion (18) in said receptacle partly bounding said passage, said shoulder portion being of arcuate section in all planes through the axis of said cylinder.

7. In an apparatus as set forth in claim 1, said guide member (4) having an outer face of substantially circular cross section about the axis of said cylinder (1), said face being formed with an annular groove (20) about said axis, and an annular sealing member (5) of yieldably resilient material having a portion received in said groove (20) and abutting against said cylinder (1) in simultaneous sealing engagement with the latter and with said guide member (4).

8. In an apparatus as set forth in claim 1, said liner (6) being slotted so as to form an open ring about the axis of said cylinder (1), the slot in said liner (6) being obliquely inclined relative to said axis.

References Cited

UNITED STATES PATENTS

| | | | |
|---|---|---|---|
| 2,765,877 | 10/56 | De Carbon | 188—100 |
| 3,104,916 | 9/63 | Dowling et al. | 308—3.5 |
| 3,300,225 | 1/67 | Shepler | 277—188X |

FOREIGN PATENTS

| | | | |
|---|---|---|---|
| 708,556 | 5/1954 | Great Britain | 277—188 |
| 710,374 | 6/1954 | Great Britain | 277—188 |
| 850,756 | 10/1960 | Great Britain | 308—3.5 |

MANUEL A. ANTONAKAS, Primary Examiner

U.S. Cl. X.R.

188—100; 277—188; 308—36.1